US012274986B2

(12) United States Patent
Wang et al.

(10) Patent No.: US 12,274,986 B2
(45) Date of Patent: Apr. 15, 2025

(54) INORGANIC POROUS MEMBRANE (71) Applicant: National University of Singapore, Singapore (SG)

(72) Inventors: John Wang, Singapore (SG); Zhiyang Lyu, Singapore (SG); How Yong Ng, Singapore (SG); Tze Chiang Albert Ng, Singapore (SG); Jun Ding, Singapore (SG)

(73) Assignee: National University of Singapore, Singapore (SG)

( * ) Notice: Subject to any disclaimer, the term of this patent is extended or adjusted under 35 U.S.C. 154(b) by 451 days.

(21) Appl. No.: 17/627,499

(22) PCT Filed: Jul. 16, 2020

(86) PCT No.: PCT/SG2020/050415
§ 371 (c)(1),
(2) Date: Jan. 14, 2022

(87) PCT Pub. No.: WO2021/015671
PCT Pub. Date: Jan. 28, 2021

(65) Prior Publication Data
US 2022/0258104 A1    Aug. 18, 2022

(30) Foreign Application Priority Data
Jul. 25, 2019   (SG) .............. 10201906862S (51) Int. Cl.
*B01D 69/02*   (2006.01)
*B01D 61/14*   (2006.01)
(Continued)

(52) U.S. Cl.
CPC ............. *B01D 69/02* (2013.01); *B01D 61/14* (2013.01); *B01D 67/00411* (2022.08);
(Continued)

(58) Field of Classification Search
CPC .......... B01D 2315/10; B01D 2325/022; B01D 2325/04; B01D 2325/08; B01D 2325/20;
(Continued)

(56) References Cited

U.S. PATENT DOCUMENTS

| 2009/0266418 | A1* | 10/2009 | Hu ........................ H10K 30/80 |
| | | | 264/40.1 |
| 2015/0238908 | A1 | 8/2015 | Ding et al. |
| 2018/0333679 | A1 | 11/2018 | Puglia |

FOREIGN PATENT DOCUMENTS

| CN | 106915962 A | * 7/2017 | ............. C04B 35/48 |
| CN | 108883377 A | * 11/2018 | ........... B01D 53/228 |
| JP | 2019081141 A | 5/2019 | |

OTHER PUBLICATIONS

Watanabe et al, JP 2019081141A, English machine translation, pp. 1-15 (Year: 2019).*

(Continued)

*Primary Examiner* — Claire A Norris
(74) *Attorney, Agent, or Firm* — Perkins Coie LLP (57) ABSTRACT There is provided an inorganic hierarchical porous membrane comprising at least two layers, wherein each layer of the at least two layers comprises a different average pore size as compared to another layer of the at least two layers, and wherein the membrane comprises a patterned surface. There is also provided a method of forming the membrane.

15 Claims, 9 Drawing Sheets

(51) Int. Cl.
*B01D 67/00* (2006.01)
*B01D 69/12* (2006.01)
*B01D 71/02* (2006.01)
*B33Y 80/00* (2015.01)
*C02F 1/44* (2023.01)

(52) U.S. Cl.
CPC ..... *B01D 67/0069* (2013.01); *B01D 69/1216* (2022.08); *B01D 71/025* (2013.01); *B33Y 80/00* (2014.12); *C02F 1/444* (2013.01); *B01D 2325/022* (2013.01); *B01D 2325/04* (2013.01); *B01D 2325/08* (2013.01); *B01D 2325/20* (2013.01)

(58) Field of Classification Search
CPC .... B01D 61/14; B01D 65/08; B01D 67/0041; B01D 67/0069; B01D 69/02; B01D 69/12; B01D 71/025; B01D 67/00411; B01D 67/00415; B01D 69/1216; C02F 1/444
USPC .................................................. 210/500.12
See application file for complete search history.

(56) References Cited

OTHER PUBLICATIONS

Miyahara et al, CN 108883377A, English Machine translation, pp. 1-11 (Year: 2018).*
Cheng et al, CN 106915962 A, English machine translation, pp. 1-5 (Year: 2017).*
Lyu Z., et al, 3D-printed surface-patterned ceramic membrane with enhanced performance in crossflow filtration. J. Membr. Sci, Apr. 8, 2020, vol. 606, pp. 118138 [Retrieved on Oct. 28, 2020].
International Search Report mailed Oct. 28, 2020 for related PCT Application No. PCT/SG2020/050415.

* cited by examiner

→ Cross-flow stream
⇢ Permeation stream
↷ Vortex stream

INORGANIC POROUS MEMBRANE

This application is a National Stage of International Application PCT/SG2020/050415, filed Jul. 16, 2020; which claims the priority of Singapore Application No. 10201906862S, filed Jul. 25, 2019. The contents of the above-identified applications are incorporated herein by reference in their entireties.

TECHNICAL FIELD

The present invention relates to an inorganic porous membrane and a method of forming the same. In particular, the membrane is an inorganic hierarchical porous membrane.

BACKGROUND

Inorganic membranes, such as ceramic membranes, possess several known advantages over polymeric membranes, including better mechanical integrity, thermal and chemical resistance, less pollution to the environment, extended membrane life, much higher filtration flux, as well as much more efficient backwash operation at high pressures. However, there remain challenges in terms of both membrane fabrication and membrane performance, particularly in water and wastewater treatment. The traditional fabrication process of inorganic membranes result in the formation of membranes with poor microstructure, irregular and tortuous pores that are not ideal for high filtration flux, and often cause the mechanical failure at the interfaces among different layers. Poor performance in water and wastewater treatment may arise from rapid fouling, leading to high maintenance and operation costs.

There is therefore a need for an improved inorganic membrane and a method of fabricating the same.

SUMMARY OF THE INVENTION

The present invention seeks to address these problems, and/or to provide an improved inorganic porous membrane and a method for forming the same.

According to a first aspect, the present invention provides an inorganic hierarchical porous membrane comprising at least two layers, wherein each layer of the at least two layers comprises a different average pore size as compared to another layer of the at least two layers, and wherein the membrane comprises a patterned surface.

For example, the inorganic membrane may be a ceramic-based membrane.

The at least two layers may be provided on a surface of a porous substrate. The porous substrate may be any suitable substrate. For example, the porous substrate may be a ceramic-based porous substrate.

In particular, the patterned surface may be provided on a layer of the at least two layers furthest from the substrate surface. The patterned surface may be formed by any suitable method. For example, the patterned surface may be formed by, but not limited to: 3D printing, imprinting or a combination thereof.

According to a particular aspect, the at least two layers may comprise:
a buffer layer formed on a porous substrate; and
an active layer formed on the buffer layer,
wherein a surface of the active layer is patterned to form the patterned surface and wherein average pore size of the active layer is smaller than average pore size of the buffer layer.

In particular, the buffer layer may comprise at least two buffer layers formed on the porous substrate. The buffer layer may comprise pores having an average pore size of 0.05-1.5 µm. The buffer layer may have any suitable thickness. For example, the buffer layer may have a thickness of 1-50 µm.

In particular, the active layer may comprise pores having an average pore size of 0.01-0.2 µm. The active layer may have any suitable thickness. For example, the active layer may have a thickness of 1-20 µm.

The patterned surface may have any suitable height. For example, the patterned surface may have a height of 50-300 µm.

According to a particular aspect, the membrane may have a water flux of $\geq 50$ $m^3/m^2 \cdot day$.

According to a second aspect of the present invention, there is provided a method of forming the membrane described above, the method comprising:
depositing a feed composition to form at least two layers on a surface of a porous substrate, wherein each layer of the at least two layers is formed by depositing the feed composition layer-by-layer to form a membrane structure;
forming a surface pattern on a layer of the at least two layers furthest from the substrate surface to form a patterned surface layer; and
sintering the membrane structure with the patterned surface layer to form the membrane.

In particular, the depositing may be by any suitable method. For example, the depositing may comprise, but is not limited to: dip coating, spin coating, spray coating, or a combination thereof. In particular, the depositing may comprise depositing a different feed composition for forming each layer of the at least two layers, each of the different feed compositions comprising inorganic material having a different average particle size. Accordingly, each layer of the at least two layers formed from the depositing may comprise a different average pore size as compared to another layer of the at least two layers.

The feed composition may be of any suitable composition. For example, the feed composition comprises a mixture of an inorganic material, a solvent, and a surfactant.

The inorganic material may be any suitable material. For example, the inorganic material may be a ceramic-based material. The surfactant may be any suitable surfactant. For example, the surfactant may comprise a poloxamer.

The forming a surface pattern may be by any suitable method. For example, the forming a surface pattern may be by, but not limited to, 3D-printing, imprinting, or a combination thereof.

The sintering may be under any suitable conditions. For example, the sintering may be at a suitable temperature. According to a particular aspect, the temperature may be about 1200-1500° C.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIGS. 2(a), (b) and (c) show sectional images of the membranes, while FIGS. 2(d), (e) and (f) show the surface images of the membrane. FIGS. 2(a) and (d) show the overall configuration of the membrane while Figures (b), (c), (e) and (f) show the enlarged patterned area as marked in FIGS. 2(a) and (d). The insert in FIG. 2(f) is an image of the membrane;

FIG. 4(a) shows the cross-section SEM image, FIG. 4(b) shows the comparison of the water flux for pure water by dead-end filtration between a membrane with a hierarchical pore structure and a non-hierarchical pore structure;

FIGS. 6(a) and (b) show normalized steady flux of surface-patterned gradient membranes and non-patterned gradient membranes, respectively, in diluted activated sludge, tested for crossflow filtration, at a transmembrane pressure (TMP) of 100 kPa and 50 kPa, respectively. FIG. 6(c) is a schematic representation of the effect of surface patterns on preventing the deposition of foulants;

FIGS. 8(a), (b) and (c) show the cross-section SEM images of the membrane with: a middle distance of about 500 µm, a long distance of about 1000 µm, and short distance of about 200 µm, respectively, with a scale bar of 100 µm. FIG. 8(d) shows the normalized steady flux of the marked membranes in diluted activated sludge by crossflow filtration; FIGS. 9(a), (b) and (c) show the cross-section SEM images of the membrane with: a middle height of about 120 µm, a low height of about 80 µm, and a high height of about 250 µm, respectively, with a scale bar of 100 µm. FIG. 9(d) shows the normalized steady flux of the marked membranes in diluted activated sludge by crossflow filtration.

DETAILED DESCRIPTION

As explained above, there is a need to provide an improved inorganic membrane.

In general terms, the present invention relates to an inorganic surface-patterned membrane with well-controlled gradient pore structure and in particular, one which significantly enhances filtration flux and simultaneously reduces fouling during water and wastewater treatment.

According to a first aspect, the present invention provides an inorganic hierarchical porous membrane comprising at least two layers, wherein each layer of the at least two layers comprises a different average pore size as compared to another layer of the at least two layers, and wherein the membrane comprises a patterned surface. A schematic representation of the membrane according to the present invention is provided at FIG. 1(a).

The inorganic membrane may be of any suitable inorganic material. For example, the inorganic membrane may be a ceramic-based membrane. For the purposes of the present invention, a ceramic-based membrane may be considered to comprise membranes comprising a ceramic material or ceramic-based composite materials. In particular, the inorganic membrane of the present invention may comprise any suitable material selected from, but not limited to, aluminium oxide ($Al_2O_3$), zeolites, silica ($SiO_2$), silicate glass, titanium dioxide ($TiO_2$), zirconium dioxide ($ZrO_2$), silicon carbide (SiC), or a combination thereof. The inorganic membrane may also comprise any carbon-based ceramic materials, carbides, nitrides, or a combination thereof.

The at least two layers may be provided on a surface of a porous substrate. The porous substrate may be any suitable porous substrate. According to a particular aspect, the porous substrate may be a ceramic-based porous substrate. For example, the porous substrate may be, but not limited to, $Al_2O_3$, $TiO_2$, $ZrO_2$, $SiO_2$, silicates, SiC, or a combination thereof. In particular, the porous substrate may be $Al_2O_3$. Even more in particular, the porous substrate may be a polycrystalline $Al_2O_3$ substrate.

According to a particular aspect, the at least two layers may comprise:
 a buffer layer formed on the surface of a porous substrate; and
 an active layer formed on the buffer layer,
 wherein a surface of the active layer is patterned to form the patterned surface and wherein average pore size of the active layer is smaller than average pore size of the buffer layer.

The buffer layer may be any suitable buffer layer. In particular, the buffer layer may comprise at least two buffer layers formed on the surface of a porous substrate. For example, the buffer layer may comprise 1-5 layers, 2-4 layers or 3-4 layers. The buffer layer serves as an intermediate layer between the porous substrate and the active layer to bridge large variations in pore sizes of the porous substrate and the active layer. In particular, the at least two buffer layers may further optimise the hierarchical porous membrane structure by retarding internal fouling when in use, since any foulant particle smaller than the surface pore size within the hierarchical membrane structure may be swept through the membrane by permeate flow. In this way, the water flux may be increased and membrane resistance may be reduced.

According to a particular aspect, the buffer layer may comprise two or more layers. Each of the two or more layers may have the same or different porous structure. In particular, each of the two or more layers may have a different porous structure. For example, the layers closer to the surface of the substrate may comprise larger pores while the layers closer to the active layer may comprise smaller pores.

The buffer layer may comprise pores of different pore sizes. Accordingly, the average pore size of the pores comprised within the buffer layer may be 0.05-1.5 µm. For example, the average pore size of pores comprised within the buffer layer may be 0.09-1.3 µm, 0.1-1.1 µm, 0.2-1.0 µm, 0.3-0.9 µm, 0.4-0.8 µm, 0.5-0.7 µm, 0.55-0.6 µm. In particular, the average pore size may be 0.09-0.2 µm.

The buffer layer may be of a suitable thickness. For example, the buffer layer may have a thickness of 1-50 µm. For example, the thickness of the buffer layer may be 3-45

μm, 5-40 μm, 10-35 μm, 15-30 μm, 20-25 μm, 22-24 μm. In particular, the thickness of the buffer layer may be 5-40 μm.

The active layer may be any suitable active layer. In particular, the active layer may control the filtration efficiency when in use. Accordingly, the active layer may comprise small and uniform pores. For example, the active layer may comprise pores having an average pore size of 0.01-0.2 μm. In particular, the average pore size of the pores comprised in the active layer may be 0.02-0.1 μm, 0.05-0.09 μm, 0.06-0.08 μm. Even more in particular, the average size of the pores may be 0.05-0.09 μm.

The active layer may have any suitable thickness. For example, the active layer may have a thickness of 1-20 μm. For example, the thickness may be 3-18 μm, 5-15 μm, 8-12 μm, 9-10 μm. In particular, the thickness of the active layer may be about 8 μm.

The patterned surface may be provided on a layer of the at least two layers furthest from the surface of the substrate on which the at least two layers are provided. The patterned surface may comprise any suitable pattern. For example, the patterns may be formed at suitable distances and having a suitable height. In particular, the surface pattern may comprise, but is not limited to, lines, honeycombs, pyramids, concentric circles, curves, or a combination thereof. Even more in particular, the surface pattern may comprise lines.

According to a particular aspect, the distance between the patterns may be 50-1000 μm. In particular, the distance between the patterns may be 75-975 μm, 100-900 μm, 125-875 μm, 150-800 μm, 175-750 μm, 200-700 μm, 225-675 μm, 250-650 μm, 275-600 μm, 300-550 μm, 350-500 μm, 375-475 μm, 400-450 μm. Even more in particular, the distance between the patterns may be 80-300 μm.

According to a particular aspect, the height of the pattern may be 50-300 μm. In particular, the height of the patterned lines may be 70-275 μm, 100-250 μm, 120-225 μm, 125-200 μm, 150-180 μm, 155-175 μm. Even more in particular, the height of the pattern may be 80-150 μm.

The patterned surface may be formed by any suitable method. For example, the patterned surface may be formed by, but not limited to: 3D printing, imprinting or a combination thereof.

According to a particular aspect, the membrane may have a water flux of ≥50 $m^3/m^2 \cdot day$. In particular, the membrane may have a higher water flux compared to a membrane of equivalent thickness but without a hierarchical pore structure or surface pattern.

As described above, the membrane of the present invention comprises a gradient pore structure. In this way, there is a link between the very porous substrate and the fine top active layer. The gradient pore structure of the membrane may prevent the penetration of the very fine particles used for the top active layer into the porous substrate. Further, the gradient pore structure effectively provides a conical-shaped porous structure to the membrane which enhances the water flux. The top active layer with the finest level of pores is responsible for the separation and determines the filtration performance while the surface pattern on the top active layer is designed to improve the flux and antifouling properties by forming extra surfaces and local flow turbulence.

According to a second aspect of the present invention, there is provided a method of forming the membrane described above, the method comprising:

depositing a feed composition to form at least two layers on a surface of a porous substrate, wherein each layer of the at least two layers is formed by depositing the feed composition layer-by-layer to form a membrane structure;

forming a surface pattern on a layer of the at least two layers furthest from the substrate surface to form a patterned surface layer; and sintering the membrane structure with the patterned surface layer to form the membrane.

Figure 1:
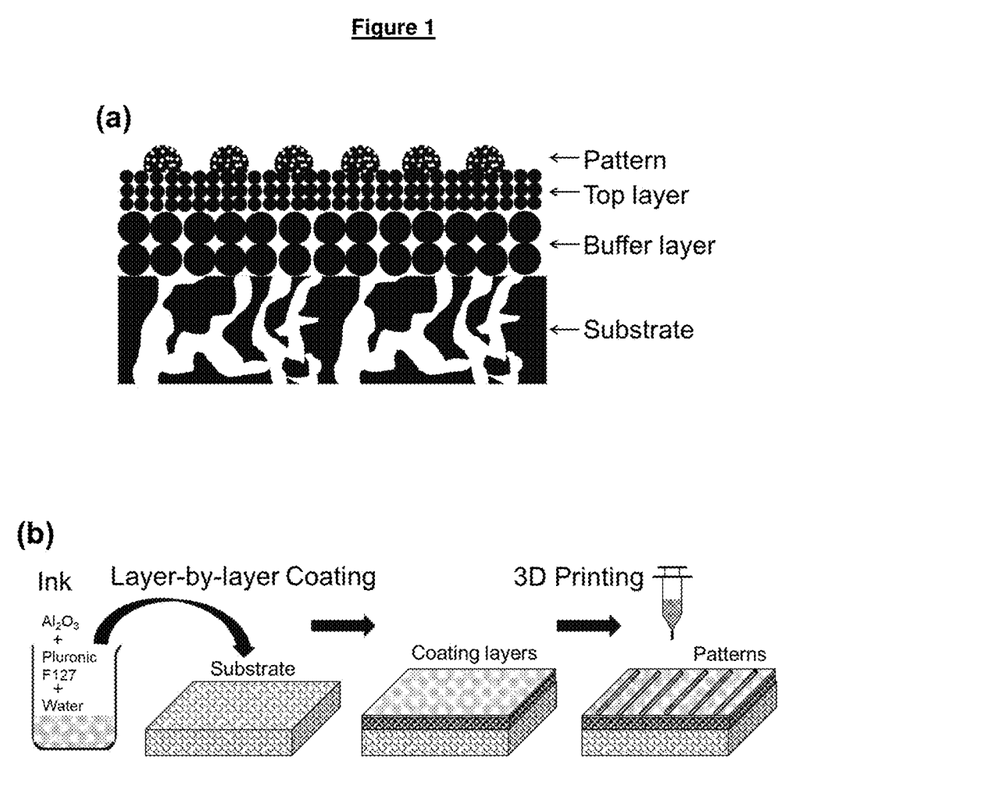
FIG. 1(a) shows a schematic representation of the cross-section of a membrane according to one embodiment of the present invention and FIG. 1(b) shows a schematic representation of the method of forming the membrane according to one embodiment of the present invention.

FIG. 1(b) provides a schematic representation of the method of the present invention.

The feed composition may be of any suitable composition. According to a particular aspect, the feed composition may comprise a mixture of an inorganic material, a solvent, and a surfactant.

The inorganic material may be any suitable inorganic material. For example, the inorganic material may be a ceramic-based material. For the purposes of the present invention, a ceramic-based material may be considered to comprise ceramic materials or ceramic-based composite materials. The inorganic material may also comprise carbon-based ceramic materials, carbides and nitrides. In particular, the inorganic material may be any suitable material selected from, but not limited to, aluminium oxide ($Al_2O_3$), zeolites, silica ($SiO_2$), silicate glass, titanium dioxide ($TiO_2$), zirconium dioxide ($ZrO_2$), silicon carbide (SiC), or a combination thereof. In particular, the inorganic material may be $Al_2O_3$.

The solvent may be any suitable solvent. According to a particular aspect, the solvent may be any solvent which is compatible with the inorganic material and the surfactant comprised in the feed composition. For example, the solvent may be, but not limited to, water, xylene, isopropyl alcohol (IPA), or a combination thereof. In particular, the solvent may be deionized water.

The surfactant may be any suitable surfactant. The surfactant may also be a binder and/or a pore forming agent. According to a particular aspect, the surfactant may comprise a poloxamer. For example, the surfactant may be, but not limited to, tri-block copolymers of poly(ethylene oxide) poly(propylene oxide)-poly(ethylene oxide) (PEO-PPO-PEO), poly(vinyl alcohol) (PVA), poly(vinyl butyral) (PVB), or a combination thereof. In particular, the surfactant may be PEO-PPO-PEO.

The feed composition may be in any suitable form. For example, the feed composition may be in the form of a slurry or paste.

The feed composition may be prepared by any suitable method. For example, the feed composition may be prepared by adding the inorganic material to the solvent to form a suspension of the inorganic material and subsequently adding a suitable amount of surfactant to form a mixture. A suitable amount of inorganic material may be added to the solvent. For example, 20-50 wt. % of inorganic material may be added to the solvent based on the total weight of the suspension formed. The amount of surfactant added may be about 10-35 wt. %. The mixture may be left to stand for a pre-determined period of time at a pre-determined temperature to enable the surfactant to dissolve. The pre-determined period of time may be 3-24 hours. The pre-determined temperature may be 2-40° C.

The depositing may be by any suitable method. For example, the depositing may comprise, but is not limited to: dip coating, spin coating, spray coating, 3D printing, or a combination thereof.

According to a particular aspect, the depositing may comprise spin coating the feed composition on a surface of a porous substrate. The porous substrate may be as described above. The spin coating may be under suitable conditions. For example, the spin coating may be at a spin rate of 2000-6000 rpm. In particular, the spin rate may be about 4000 rpm. The spin time may be about 0.5-3 minutes. In particular, the spin time may be about 2 minutes.

According to another particular aspect, the depositing may be by dip coating the feed composition on a surface of a porous substrate. The porous substrate may be as described above. The dip coating may be carried out for a suitable period of time. For example, the period of time for dip coating may be dependent on the thickness to be achieved. In particular, the period of time may be 3-10 seconds.

The depositing may be at a suitable temperature. For example, the depositing may be at a temperature of 2-40° C. In particular, the temperature may be dependent on the method used for the depositing. For example, if the depositing is by dip coating, the depositing may be at a temperature of about 4° C. If the depositing is by 3D printing, the depositing may be at room temperature.

According to a particular aspect, the depositing may comprise depositing a different feed composition for forming each layer of the at least two layers. Each of the different feed compositions may comprise inorganic material having a different average particle size. Accordingly, each layer of the at least two layers formed from the depositing may comprise a different average pore size as compared to another layer of the at least two layers. In particular, the pore size and the size distribution of the pores in each of the different layers of the membrane formed from the method may be controlled based on the different particle size of the inorganic material used in preparing the feed composition. The different pore size and size distribution of the pores in the different layers may also be controlled by depositing different phases of the feed composition.

The forming a surface pattern may be by any suitable method. For example, the forming a surface pattern may be by, but not limited to, 3D-printing, imprinting, or a combination thereof.

According to a particular aspect, the forming a surface pattern may be by 3D-printing. The method may further comprise drying the substrate with the at least two layers prior to the forming a surface pattern by 3D-printing. The drying may be for a suitable period of time. For example, the drying may be for 0.5-24 hours. In particular, the drying may be for about 2-18 hours, 4-12 hours, 6-10 hours. Even more in particular, the drying may be for about 12 hours. The drying may be at a suitable temperature. For example, the drying may be at room temperature. The 3D-printing may be by any suitable means. For example, the 3D-printing may be by a 3D printer. The forming a surface pattern may comprise feeding a feed composition to a 3D printer. The feed composition may be similar to that used for the formation of the layer on which the surface pattern is to be formed.

According to another particular aspect, the forming a surface pattern may be by imprinting. In particular, the forming a surface pattern by imprinting may comprise applying a patterned mould to the layer on which the surface pattern is to be formed. The patterned mould may comprise the pattern which is to be applied. Even more in particular, the patterned mould may be applied to the layer on which the surface pattern is to be formed before the layer is completely dried. The patterned mould may be applied for a suitable period of time under a controlled pressure. Upon withdrawing the mould, a pattern is imprinted on the layer.

The forming a surface pattern may comprise forming any suitable pattern. The pattern may be as described above.

The method may further comprise drying the patterned surface layer following the forming a surface pattern. The drying may be for a suitable period of time and under suitable conditions. For example, the drying may be for 12-48 hours. In particular, the drying may be for about 30 hours. The drying may be under ambient conditions.

The sintering may be under any suitable conditions. For example, the sintering may be at a pre-determined temperature for a pre-determined period of time. The pre-determined temperature may be dependent on the material used for forming the membrane. According to a particular aspect, the pre-determined temperature may be about 1200-1500° C. In particular, the pre-determined temperature may be 1250-1450° C., 1300-1400° C., 1325-1350° C. Even more in particular, the pre-determined temperature may be about 1400° C.

According to a particular aspect, the pre-determined period of time may be 1-3 hours. In particular, the pre-determined period of time may be 1.5-2.5 hours, 1.75-2.25 hours, 1.9-2 hours. Even more in particular, the pre-determined period of time may be about 2 hours.

Whilst the foregoing description has described exemplary embodiments, it will be understood by those skilled in the technology concerned that many variations may be made without departing from the present invention.

Having now generally described the invention, the same will be more readily understood through reference to the following examples which are provided by way of illustration, and are not intended to be limiting.

EXAMPLE

Materials

Commercially available alumina powders were purchased from SUMITOMO CHEMICAL (Japan), including the AA-04 (grain size of 0.5 µm for preparing the feed composition for the top active layer) and AA-3 (grain size of 3.4 µm for preparing the feed composition for the buffer layer) types. Surfactant Pluronic® F127 powder was purchased from SIGMA-ALDRICH (Singapore) and used without further purification. Porous ceramic substrate supports (e.g., polycrystalline $Al_2O_3$ with dimensions of 25×25×6 mm) commercially available were obtained.

Fabrication Method of Gradient Membrane

Alumina suspension/paste was prepared by adding 27 wt. % alumina powder to deionized water. 17 wt. % Pluronic® F127 powder was then added into the suspension and was left in a refrigerator at a temperature of 6° C. for a time period of about 20 hours to dissolve. The feed composition was obtained after gently and thoroughly being stirred at a temperature of 2-8° C. The feed composition was then dip coated layer-by-layer on a porous ceramic substrate support to fabricate the gradient membrane. In particular, the buffer layer was dip coated for about 10 seconds while the top active layer was dip coated for about 3 seconds.

The layers of the gradient membrane were then allowed to dry for about 2 hours. The gradient membrane was then ready for assembling of surface patterns by 3D-printing. The feed composition used for coating the top active layer was loaded into 20 mL syringes attached by a luer-lock stainless-steel blunt-end tip (300 µm, ABLE Industrial Engineering, Singapore), and the patterns were then printed onto the surface of the top active layer using a single extruder, 3-axis micro-positioning stage (Allevi 2 Bioprinter, Allevi), where the motion was controlled by a CAD software (SolidWorks Corporation). A compressed air pneumatic system was used to pressurize the syringe barrel to about 40 PSI and to control the gel flow rate. The typical printing speed for the feed composition was about 18 mm/s.

After the surface printing, the membrane was left to dry under ambient conditions for about 30 hours to solidify the printed structure, and then placed in a furnace chamber (RHF 16/35, CARBOLITE) for sintering at a temperature of about 1400° C. for a time period of about 2 hours. The heating rate was 1° C./min.

Fabrication Method of Non-Gradient Membrane (Control)

A similar method as described above for the gradient membrane was followed, except that a single feed composition was used in forming the membrane, i.e. the feed composition of the top active layer described above. The dip coating time was about 20 seconds to achieve a similar thickness with that of the gradient membrane. The sintering conditions for the non-gradient membrane were the same as that of the patterned gradient membrane.

Membrane Characterisation

Porosimetry (Quantachrome 3GWin2) was used for the characterization of the pore size distribution.

Pure Water Flux by Dead End Filtration

Water permeation test was conducted by the dead end filtration, in which the cell for ceramic membrane pieces allowed for a single active side of the membrane to be tested. MilliQ water used in the tests was pre-treated through a 0.02-μm filter to remove any possible colloidal particles, and is referred to as pure water hereafter. The diameter of the active filtration area was 16 mm and a constant pressure of 100 kPa was applied. The weight of permeate and the corresponding permeation time were recorded to calculate the water flux. All tests were conducted at 25° C.

Fouling Development by Cross-Flow Filtration

The fouling performance test was conducted by cross-flow filtration, in which diluted activated sludge with a working concentration of 500 mg/L was used as the feed at a cross flow velocity of 0.05 m/s. The cross-flow filtration experiments were conducted at three different configurations such that the feed-flow direction is parallel, angled, and perpendicular to the surface-patterned lines.

Results and Analysis

The obtained membrane was first studied using Scanning Electron Microscopy (SEM) for the cross-section and surfaces, as shown in FIGS. 2(a) to (f). As can be seen particularly from FIGS. 2(a) to (c), the top layers are well sintered together with the underlying ceramic substrate and the overlying printed patterns, and no cracks are observed on the surface.

Figure 2:
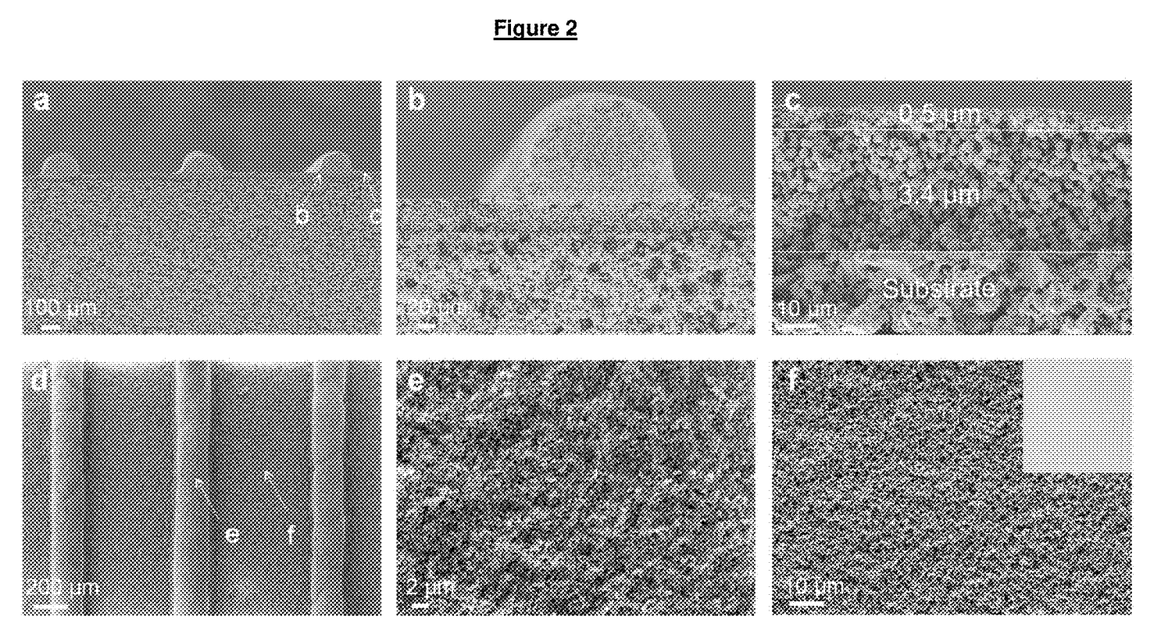
FIG. 2 shows the SEM images of membranes according to one embodiment of the present invention.

The average height of printed patterns is about 100 to 200 μm and the spacing between the two aligned patterns are about 300-500 μm (see FIG. 2(d)). The thickness of the coated layers is about 40 μm, while the top layer is about 8 μm (see FIG. 2(c)) to favour the filtration flux. Moreover, there are abundant pores within the surface patterns and on the surface as observed from the high-resolution SEM images FIGS. 2(e) and (f).

Figure 3:
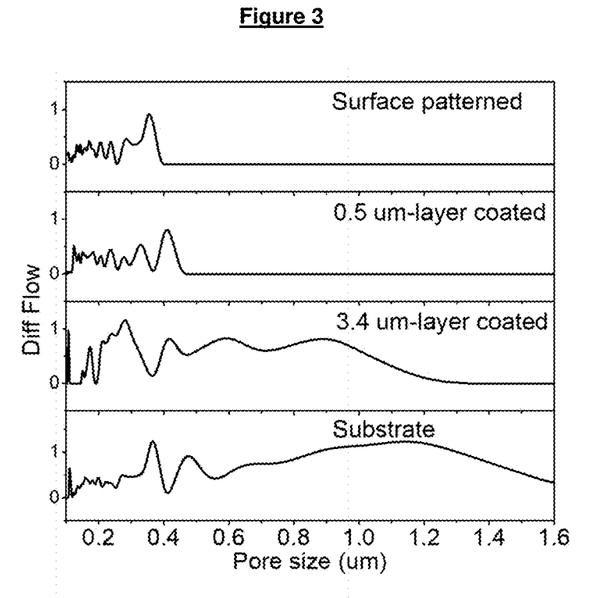
FIG. 3 shows the results of porosimetry measurement for alumina membrane with surface pattern comprising layers formed from different particle sizes.

Porosimetry studies showed that the buffer layer formed from $Al_2O_3$ powder having an average particle size of about 3.4 μm exhibited both small pores of about 0.09 μm distributed in a narrow range and relatively large ones of about 0.2 μm distributed in a wide range (see FIG. 3). Upon coating of the active layer formed from $Al_2O_3$ powder having an average particle size of about 0.5 μm, and then subsequent 3D-printing the surface patterns, the pore sizes within the membrane had decreased below 0.09 μm. The pores in the 3D-printed surface-patterned alumina membrane were largely concentrated at 0.07-0.09 μm.

Figure 4:
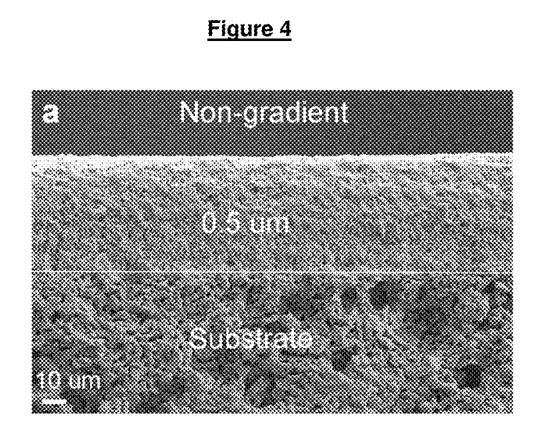
FIG. 4 shows the structure of a control membrane without a hierarchical pore structure. In particular.

Filtration performances were first conducted by a dead end module in pure water. The pore gradient membrane was able to achieve a high water flux of 99.2 $m^3/m^2 \cdot day$. This was more than thrice as compared to the water flux of its non-gradient counterpart, which had a water flux of 30.9 $m^3/m^2 \cdot day$, despite both the gradient and non-gradient membranes having approximately the same thickness (see FIG. 4). Accordingly, the advantage of the gradient structure can be seen.

Figure 5:
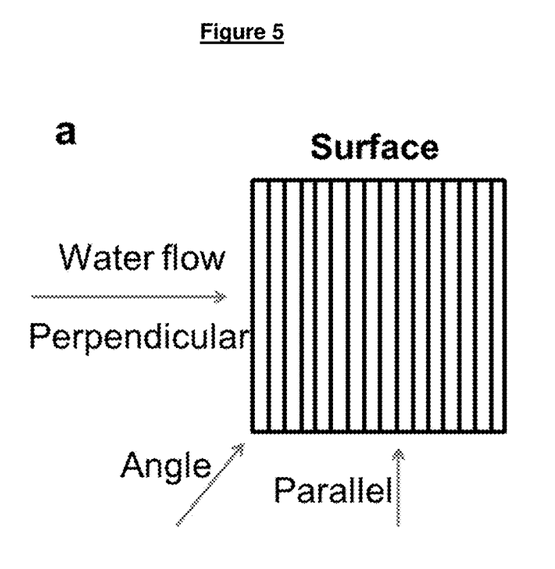
FIG. 5(a) shows a schematic representation of feed flow directions to the patterned lines on a membrane surface.
FIG. 5(b) shows the initial steady flux of the hierarchical membranes with surface patterns in pure water with three different feed flow directions by crossflow filtration and compared to a non-patterned membrane.

Antifouling ability of the surface-patterned gradient membranes was then evaluated by using the cross-flow filtration, where the feed-flow direction was adjusted in parallel, angle, and perpendicular direction to the patterned lines, respectively, as shown in FIG. 5a. FIG. 5b shows that the gradient membranes with patterns with different feed flow directions had slightly higher initial steady fluxes in pure water than that of the non-patterned membranes. This indicates that the innate membrane characteristics has certain effect on the filtration behaviour of pure water, which contained no particulates.

Figure 6:
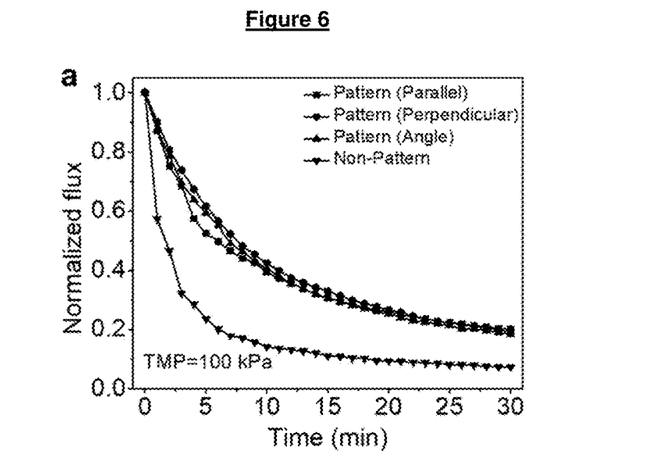

Subsequently, the effects of the 3D-printed surface patterns on alumina membrane fouling was determined by the foulants using diluted activated sludge at 50 ppm at the TMP of 50 kPa and 100 kPa, respectively, as shown in the FIG. 6. Generally, the 3D-printed patterned membrane retarded membrane fouling as evidenced from the higher normalized steady flux achieved in comparison to that of the non-patterned counterpart. The feed-flow direction with printed patterned membranes also affected the fouling performance, and the best anti-fouling ability was obtained when the 3D-printed patterned lines were perpendicular to the feed-flow direction, especially at early stages of filtration and under the TMP of 50 kPa. As shown in FIG. 6b, the steady flux of the surface-patterned membrane with parallel, perpendicular and angled feed-flow directions reduced to 53%, 45% and 50% of the original values, respectively, after feeding diluted activated sludge for 30 minutes. This is due to a stronger vortex stream being effectively formed in the valley areas between the 3D-printed line-patterns for the perpendicular case, as schematically depicted in FIG. 6c.

Figure 7:
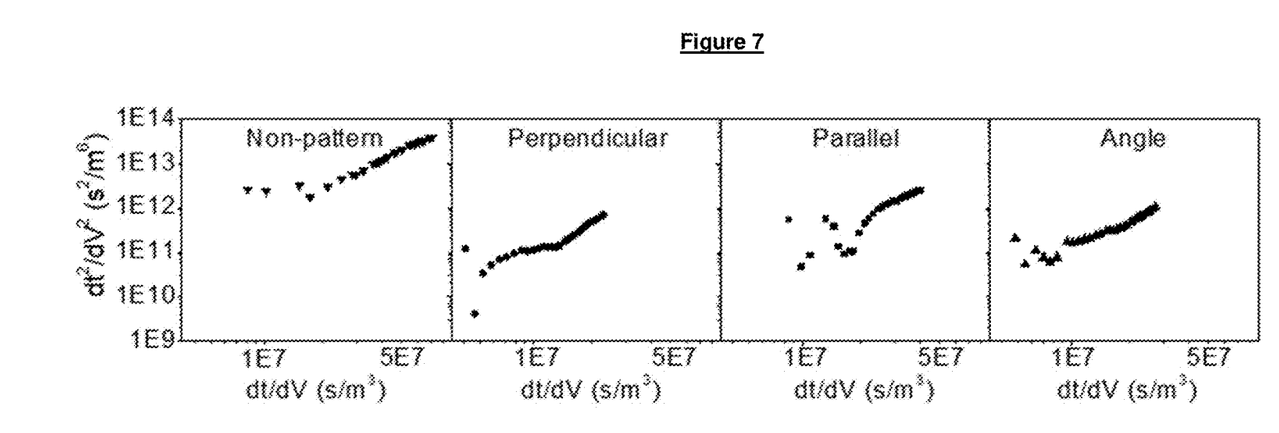
FIG. 7 shows fouling studies for surface-patterned membrane according to one embodiment of the present invention, tested at the perpendicular, angle, and parallel feed-flow directions, and compared with a non-pattern membrane at TMP of 100 kPa.

The fouling behaviour of the patterned membrane was also observed at the perpendicular, angled, and parallel feed-flow directions, and compared with the non-pattern membrane at TMP of 100 kPa, as shown in FIG. 7. The fouling mechanism evolved from the pore constriction or intermediate pore blocking (n=0.8-1.6) towards the cake filtration (n=0) at the filtration testing end.

Figure 8:
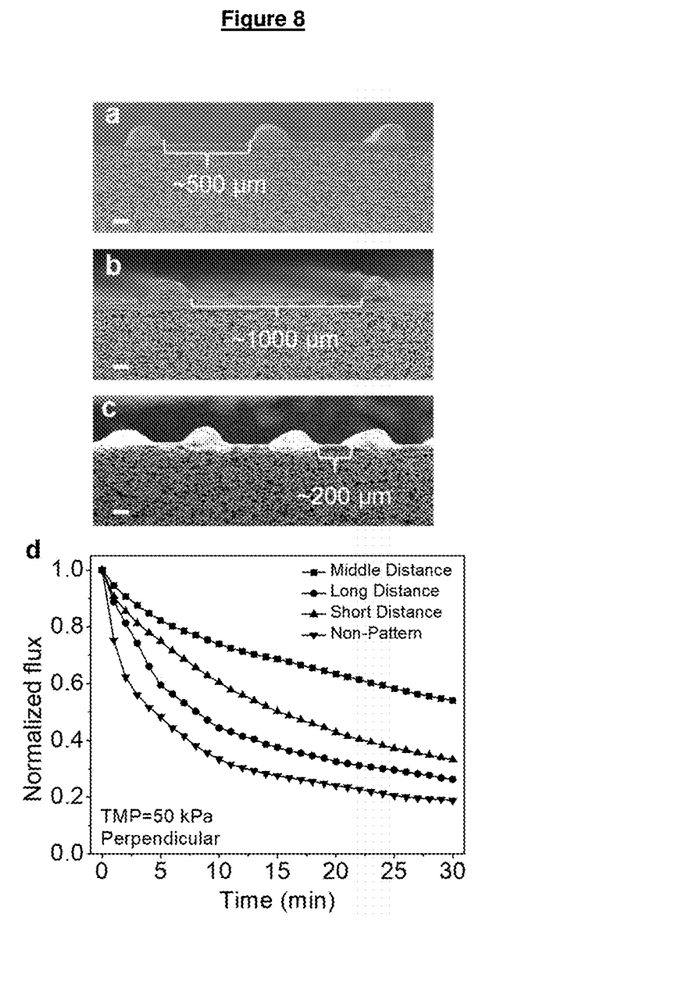
FIG. 8 shows effect of distance between printed lines on fouling.
Figure 9:
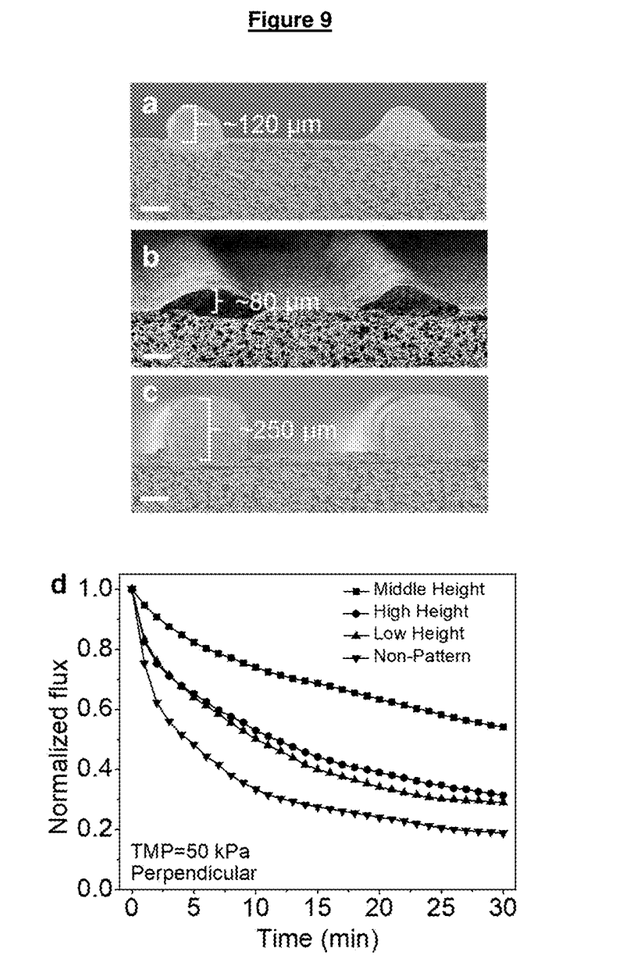
FIG. 9 shows effect of height of the printed surface lines on fouling.

Furthermore, the effect of the geometrical parameters of the printed patterns including the distances between the printed lines and the heights of the lines on the fouling was also investigated as shown in FIGS. 8 and 9. In general, both parameters affected the fouling performance. The middle distance with ~500 μm between the printed lines had the lowest steady flux reduction during the crossflow filtration of diluted activated sludge, demonstrating the best anti-fouling performance (see FIG. 8). The middle height of the printed lines had the highest normalized steady flux and showed the best anti-fouling ability as shown in FIG. 9. Therefore, these results indicate that the parameters of the printed patterns including the distance between the printed lines and the height of the printed lines also influence the effect of fouling mitigation. Moreover, there is a correlation between the distance and height of the printed patterns, which affects the fouling performance.

The invention claimed is:

1. An inorganic hierarchical porous membrane comprising at least two layers, wherein each layer of the at least two layers comprises a different average pore size as compared to another layer of the at least two layers, and wherein the membrane comprises a patterned surface, wherein the at least two layers comprise:

a buffer layer formed on a porous substrate; and an active layer formed on the buffer layer,
wherein a surface of only the active layer is patterned to form the patterned surface and wherein average pore size of the active layer is smaller than average pore size of the buffer layer,
wherein the membrane is a ceramic-based membrane.

2. The membrane according to claim 1, wherein the at least two layers are provided on a surface of a porous substrate.

3. The membrane according to claim 2, wherein the porous substrate is a ceramic-based porous substrate.

4. The membrane according to claim 2, wherein the patterned surface is provided on a layer of the at least two layers furthest from the substrate surface.

5. The membrane according to claim 1, wherein the buffer layer comprises at least two buffer layers formed on the porous substrate.

6. The membrane according to claim 1, wherein the buffer layer comprises pores having an average pore size of 0.05-1.5 µm.

7. The membrane according to claim 1, wherein the patterned surface has a height of 50-300 µm.

8. The membrane according to claim 1, wherein the buffer layer has a thickness of 1-50 µm.

9. The membrane according to claim 1, wherein the active layer has a thickness of 1-20 µm.

10. The membrane according to claim 1, wherein the membrane has a water flux of $\geq 50$ m$^3$/m$^2$ per day.

11. A method of forming the membrane according to claim 1, the method comprising:
depositing a feed composition to form at least two layers on a surface of a porous substrate, wherein each layer of the at least two layers is formed by depositing the feed composition layer-by-layer to form a membrane structure;
forming a surface pattern only on a layer of the at least two layers furthest from the substrate surface to form a patterned surface layer; and
sintering the membrane structure with the patterned surface layer to form the membrane, wherein the feed composition comprises a mixture of a ceramic-based material, a solvent, and a surfactant.

12. The method according to claim 11, wherein the depositing comprises: dip coating, spin coating, spray coating, or a combination thereof.

13. The method according to claim 11, wherein the depositing comprises depositing a different feed composition for forming each layer of the at least two layers, each of the different feed compositions comprising ceramic-based material having a different average particle size.

14. The method according to claim 11, wherein the forming a surface pattern is by 3D-printing, imprinting, or a combination thereof.

15. The method according to claim 11, wherein the sintering is at a temperature of 1200-1500° C.

* * * * *